LIGHT SENSITIVE DETECTOR AND TIME-CORRELATED GENERATOR

Filed July 17, 1967 7 Sheets-Sheet 1

INVENTORS.
MARCO I. LIPANOVICH
GARRY J. CLEVELAND
BY George Sullivan
Agent

INVENTORS.
MARCO I. LIPANOVICH
GARRY J. CLEVELAND
BY George C. Sullivan
Agent

INVENTORS.
MARCO I. LIPANOVICH
GARRY J. CLEVELAND
BY George C. Sullivan
Agent

LIGHT SENSITIVE DETECTOR AND TIME-CORRELATED GENERATOR

Filed July 17, 1967 7 Sheets-Sheet 4

INVENTORS.
MARCO I. LIPANOVICH
GARRY J. CLEVELAND
BY
George C. Sullivan
Agent

INVENTORS.
MARCO I. LIPANOVICH
GARRY J. CLEVELAND
BY George C. Sullivan
Agent

INVENTORS.
MARCO I. LIPANOVICH
GARRY J. CLEVELAND
BY
Agent

LIGHT SENSITIVE DETECTOR AND TIME-CORRELATED GENERATOR

Filed July 17, 1967 7 Sheets-Sheet 7

INVENTORS.
MARCO I. LIPANOVICH
GARRY J. CLEVELAND
BY George C. Sullivan
Agent

United States Patent Office 3,492,657
Patented Jan. 27, 1970

3,492,657
LIGHT SENSITIVE DETECTOR AND TIME-CORRELATED GENERATOR

Marko I. Lipanovich, Los Altos, and Garry J. Cleveland, Remont, Calif., assignors to Lockheed Aircraft Corporation, Burbank, Calif.

Filed July 17, 1967, Ser. No. 653,884
Int. Cl. G06f *1/00;* G11b *13/00;* H01j *39/12*
U.S. Cl. 340—172.5 1 Claim

ABSTRACT OF THE DISCLOSURE

A photo field-effect transistor in a light pen probe is utilized in conjunction with unique amplifier and logic circuit arrangements to detect nanosecond light pulses from the face of cathode ray tube at illumination levels on the order of 0.5 foot candle, for information selection from associated information storage and retrieval systems. The light sensitive detector and time-correlated generator is capable of producing a continuous visual aid, such as cursor or marker, on the face of the cathode ray tube whenever the light sensitive end of the pen is aimed at the face of the tube.

PRIOR ART AND SPECIFICATION

This invention relates to a fast response light-detecting device and to a visual aid for accurately aiming a light detector at a low intensity light source such as a television screen.

In many system applications of information retrieval, data processing, electronic drawing boards, teaching machines and the like which are linked to a computer or radar or other intelligence communication system by a cathode ray tube, it is necessary to accurately position or aim a light sensitive pick-up device with respect to a low intensity spot of light. Accuracy in the selection of the correct target and the delay time of the time correlated output pulse is essential to the efficient operation of such system applications.

The prior art light detecting devices or aids have been concerned with the problems of sensitivity of the device to ambient light and ability of the device to resolve and read time correlated light information with minimum error. Others have been concerned with the use of phototransistors as a light detector to produce an alternating current sufficient to drive relays or similar devices. Still other prior art devices have been concerned with projecting a small ring of light source to indicate the proper positioning of the light sensitive detector.

The foregoing and other prior art light sensitive aiming devices may be found in the Unted States Patents 2,862,109; 2,903,690; 3,130,317; and 3,151,248.

The foregoing patents and other prior art devices have not provided a solution to the problem of enabling a person to aim a light sensitive detector and produce a time correlated output pulse with the accuracy and the absence of error contemplated by the present invention.

In brief, the present invention embodies (a) light sensitive detector, consisting of an optical element and its associated circuitry embodied in a light pen probe, and (b) time correlated generator, consisting of linear amplifier and shaping circuitry, embodied in an electronic module. The above mentioned detector and generator modules are electrically connected to each other by a wire harness hereinafter referred to as the "light pen cable." The device detects a light signal and generates electrical signals which are used to: (1) produce a marker or cursor on the face of a cathode ray picture tube as part of the displayed intelligence and as an aid to the operator of the light pen and (2) produce a single time correlated output pulse with a delay less than 500 nanoseconds (measured from the leading edge of the light pulse on a P4 phosphor display screen to the leading edge of the output pulse).

Accordingly, the primary object of the present invention is the provision of an improved light pen probe which is highly sensitive and extremely accurate as an aid to the selection of information displayed on a cathode ray tube.

Another object of the invention is the provision of a marker or cursor as a visual aid in process of information selection.

Still another object of the invention is the provision of a light pen which is compact and easy to operate efficiently, accurately and without interferences from ambient light.

A further object of the invention is the provision of a light pen which utilizes a unique logic circuit arrangement which guarantees only one time correlated output pulse when the light pen switch is actuated.

Yet another object of the invention is the provision of a light pen probe and a time-correlated generator which is adapted for use with information retrieval, data processing and the like systems.

The novel features which are believed to be characteristic of the invention, both as to its organization and method of construction and operation, together with further objects and advantages thereof, will be better understood from the following description considered in connection with the accompanying drawings in which an illustrative embodiment of the invention is disclosed, by way of example. It is expressly understood, however, that the drawing is for the purpose of illustration and description only and does not constitute a limitation of the invention.

Figure 1:
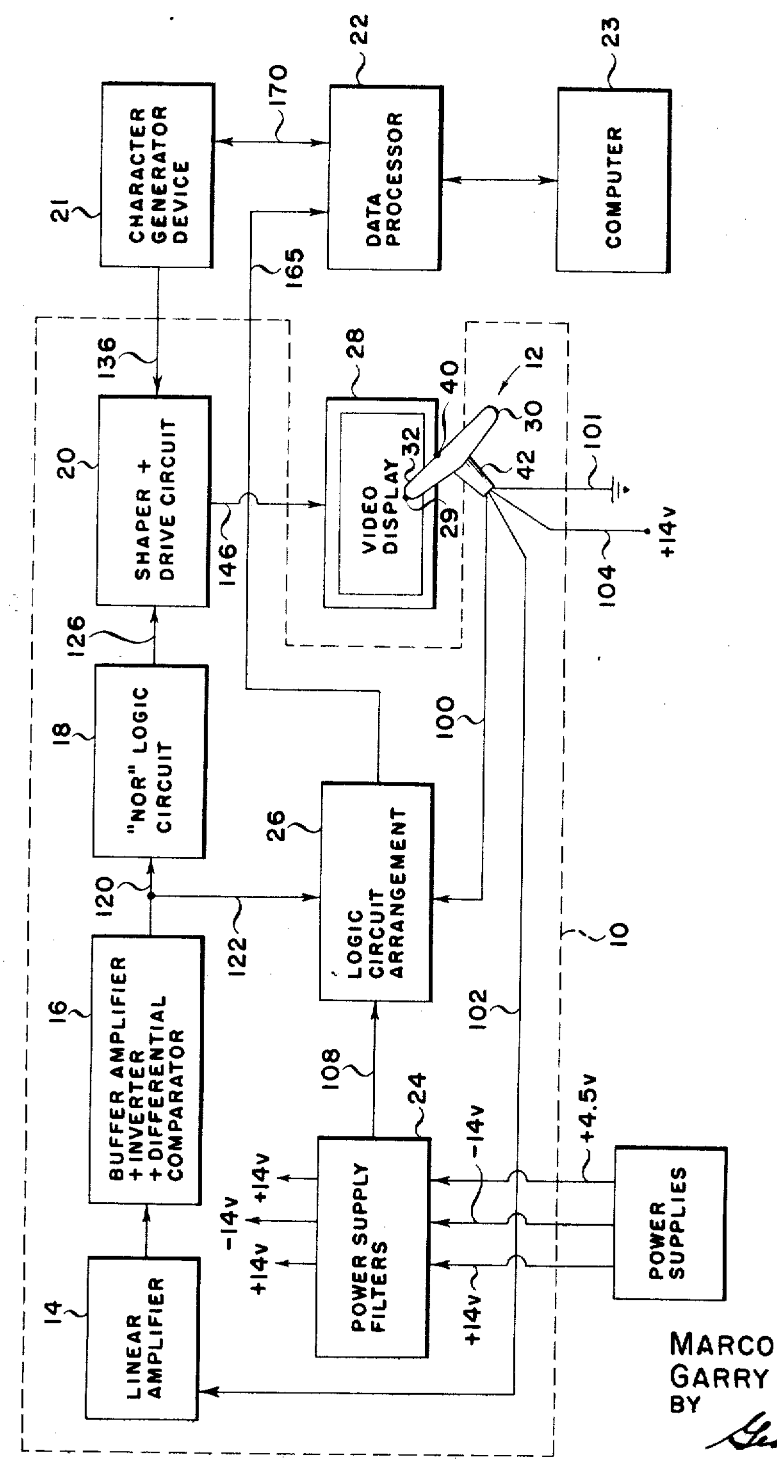
FIGURE 1 is a block circuit diagram of the light sensitive detector and time correlated generator in combination with a data processing system.

With reference to the drawings, there is shown in FIGURE 1, a block diagram of a light sensitive detector and time correlated generator 10 which includes: a light pen probe 12 and its associated circuitry, a linear amplifier circuit 14 which is connected to the light pen 12, a combination circuit arrangement 16 consisting of a current amplifier, voltage amplifier and inverter and differential comparator operating in a pulse-stretching mode which is connected to amplifier 14, a "NOR" logic circuit 18 which is connected to circuit arrangement 16, a shaper, summing and driver circuit 20 which is connected to "NOR" logic circuit 18, a power supply filter 24, and a logic circuit arrangement 26 which produces a single time correlated selection output pulse when activated. Power supply filter 24 filters the +14 v., −14 v. and +4.5 power lines derived from external power supplies.

Also shown in FIGURE 1 is a conventional computer 23, conventional video display 28, a conventional character generator 21 and conventional data processor 22 which incorporates the light sensitive detector and time correlated generator as part of a data processing system as envisioned by the present invention. More particularly, the character generator device 21 produces digital pulses which are applied to the drive circuit 20 and which are amplified to the level required at the grid of the cathode ray picture tube 28. These digital pulses contain the proper widths and timing relationships required to produce alpha-numerical characters on the face of the picture tube. The light sensitive detector and time correlated generator 10 optically resolves a single character and generates a single time correlated pulse which is transmitted to the data processor 22 to thereby identify the character (or screen area) of interest. The selection of the foregoing character is made by the light pen operator who aims the pen 12, with the aid of a cursor 29, and presses a switch 40 located on the light pen 12.

Figures 2, 3:
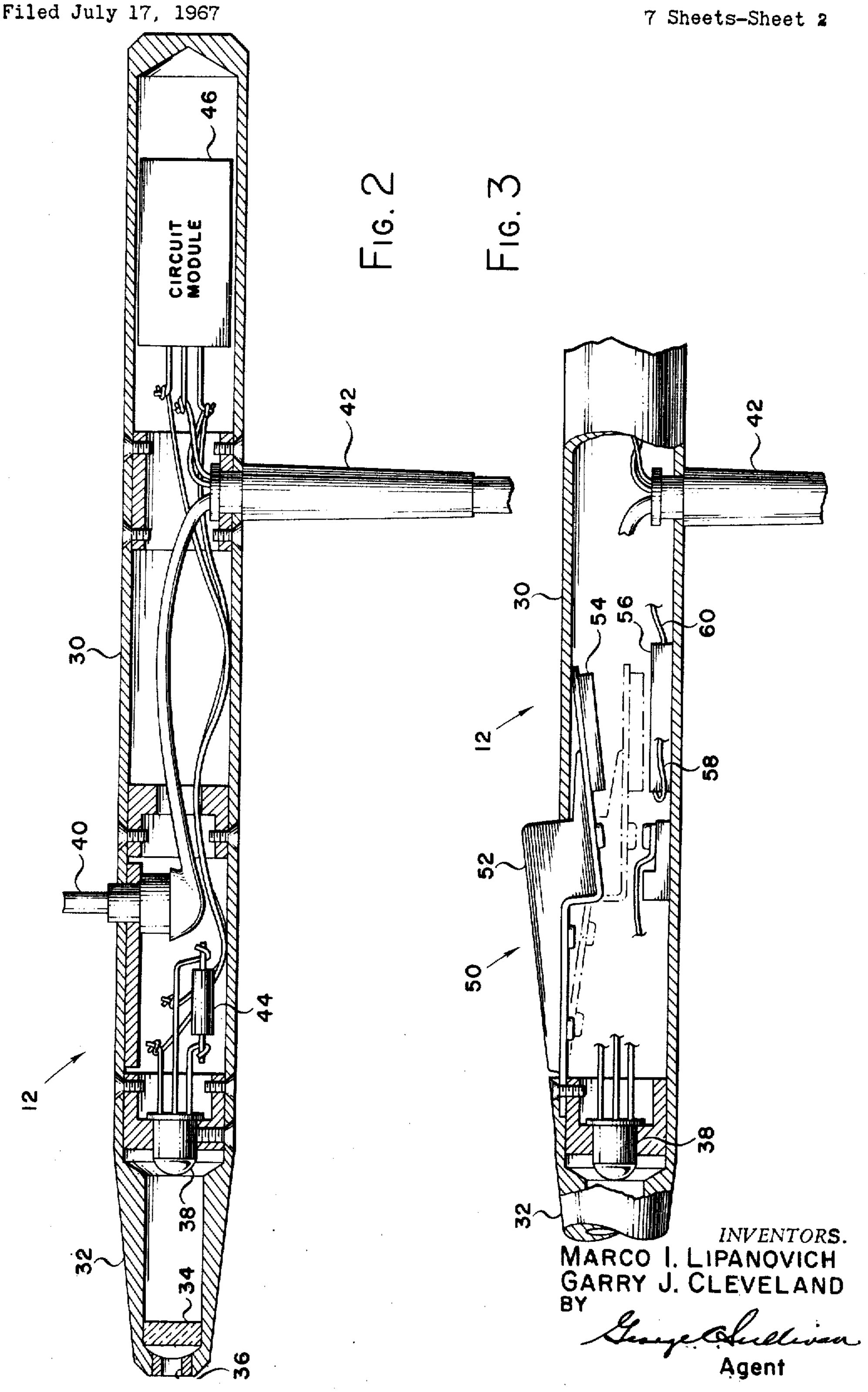
FIGURE 2 is a cross-sectional view of the light pen device of the type shown in FIGURE 1 illustrating the light detection arrangement and the signal selection mechanism.
FIGURE 3 is a cross-section view of another embodiment for the light pen device shown in FIGURES 1 and 2.

A principal feature of the invention is the use of a photo field-effect transistor which is an element of light pen probe 12. As depicted in FIGURE 2, light pen 12 shown as a cross-sectional view, includes a body 30 and a nose piece 32 connected to body 30. The nose piece 32 is constructed to provide support of a lens 34 adjacent an aperture 36 to provide a window through which light is detected by a photo field-effect transistor 38 at the opposite end of nose piece 32. Light pen 12 also includes a switch, depicted as a push button switch 40, a light pen cable 42 which includes four elements, conductors 100, 102 and 104; conductor 102 is shielded by a conductor shield 101, a fixed resistor 44 connected to transistor 38, and a circuit module 46 connected to cable 42 and transistor 38. The connections between various elements of light pen 12 will be discussed hereinbelow with reference to FIGURE 4A. Operation of light pen 12 is aided by lens 34 which collimates the field of view of the light pen probe so that the field of view is essentially independent of distance between photo sensitive transistor 38 and the display screen 28.

In FIGURE 3 there is shown another embodiment of the light pen 12 illustrating another mode for actuating the light pen. As shown light pen 12 includes a body 30 and a portion of a nose piece 32 connected to body 30. The nose piece is substantially identical to that shown in FIGURE 2 and includes an aperture and lens, which have been omitted in the interest of brevity. A magnetic switch 40 includes a button 52, an associated magnet 54, a magnetic reed arrangement 56 and an electrical contact connector 58. As shown in FIGURE 3 the solid outline of button 52 is in the normally open position, while the broken line outline of button 52 depicts the depressed or closed position which causes the magnetic reed 56 to be actuated. In the depressed position contact connector 58 makes electrical and mechanical contact with a second electrical contact connector 60. When connectors 58 and 60 are in contact with one another electrical current is permitted to pass there between. Thus switching or triggering within the light pen is accomplished. Functionally, the operation of the light pens shown in FIGURES 2 and 3 are equivalent.

Before giving a detailed description of the detector arrangement with reference to FIGURES 4A to 4D, a brief description of the operation of the device will be given. The light pen may be used to select characters from a cathode-ray tube display 28 to thereby provide useful information for the operation of an associated computer information storage and retrieval system. An operator is required only to aim the light pen probe 12 to select displayed information on cathode-ray tube 28 in the form of characters, words and the like, and to make a selection by pressing a switch, such as switch 40, on light pen probe 12. The detector and generator circuit 10 will produce a single time correlated pulse to the data processor 22 to identify the character (or screen area) of interest. In addition, continuous pulses are produced that correspond to the light pulses detected by the pen which are used to generate a marker or cursor 29 on the associate display screen of cathode ray tube 28 as a visual aid to the operator in aiming the pen while making information selection.

Figure 4A:
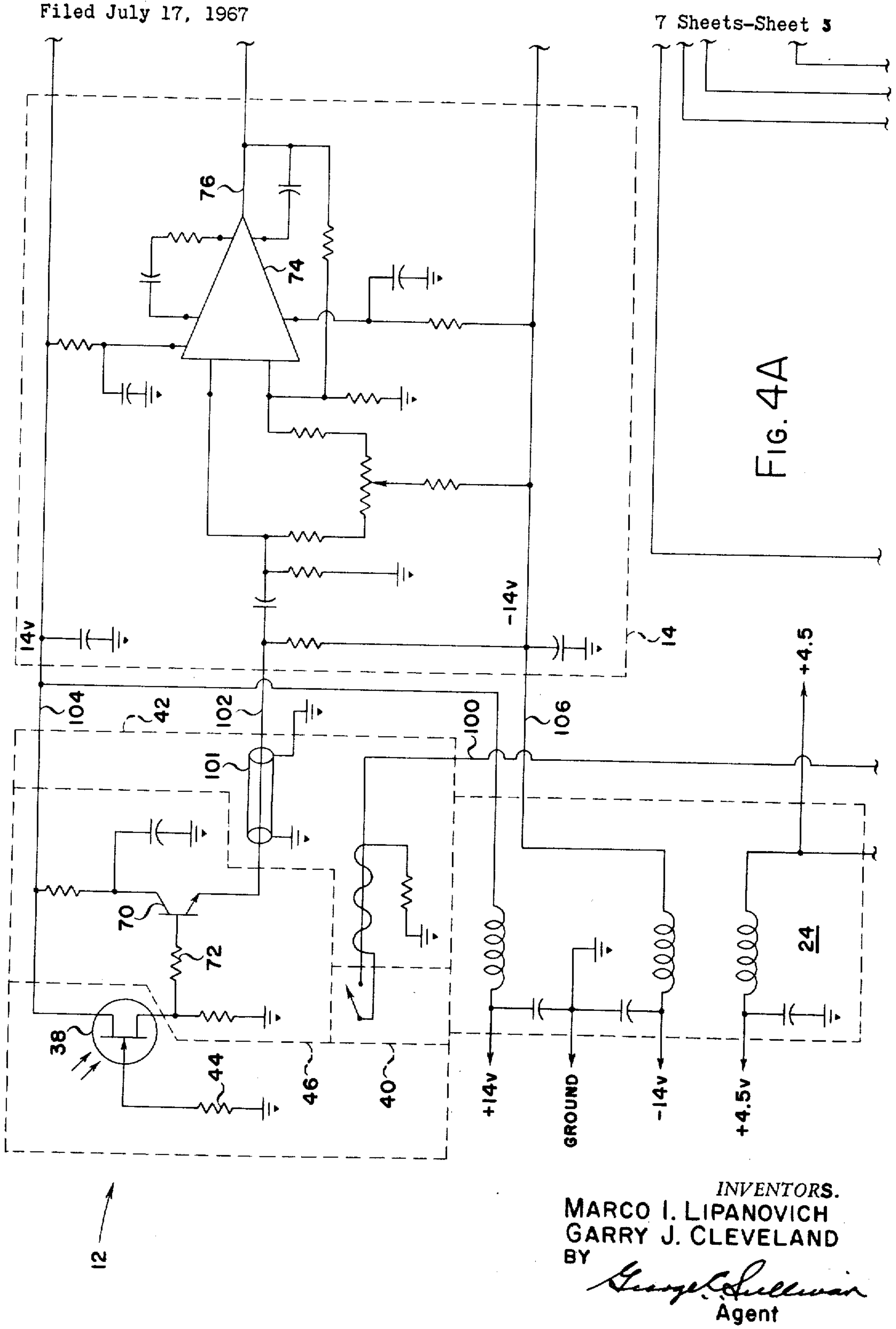
FIGURES 4A to 4D are detailed sections of a circuit diagram for the arrangement shown in FIGURE 1.

With the foregoing in mind, a description of the detailed detector circuitry and system arrangement will be given with reference to FIGURES 4A to 4D. As shown in FIGURE 4A, the light pen probe 12 includes a photo field-effect transistor 38 as an essential element. Photo sensitive transistor 38 is utilized in conjunction with high frequency techniques which have not heretofore been known to be employed for light pen probe signal detection. The use of high frequency techniques permits the production of output signals with response times on the order of one hundred (100) nanoseconds or less ($10^{-7}$ seconds) with amplitudes on the order of several millivolts. The output from transistor 38 is applied to the base of an emitter-follower buffer transistor 70 through a series connected resistor 72 located in light pen 12. Transistor 70 has a voltage gain of nearly unity and provides the current amplification necessary to drive a shielded line 102 of the pen 12 which is alternating current (A.C.) coupled to the non-inverting input of linear amplifier network 14. Amplifier 14 consists of a high-speed, high gain integrated operational amplifier element 74 and its associated circuitry functioning as a linear amplifier with a closed loop voltage gain on the order of one hundred (100). Thus, an exemplary 2 millivolt positive signal generated by transistor 70, which is coupled to an amplifier circuit 74 produces a 200 millivolt positive pulse at the output of amplifier 74 at a terminal 76. The resulting pulse has a duration (pulse width) on the order of 200 nanoseconds and is applied to an emitter-follower transistor 78 of circuit arrangement 16 shown in FIGURE 4B, which isolates operational amplifier circuit 74 from a transistor 82 and its associated circuitry.

Figure 4B:
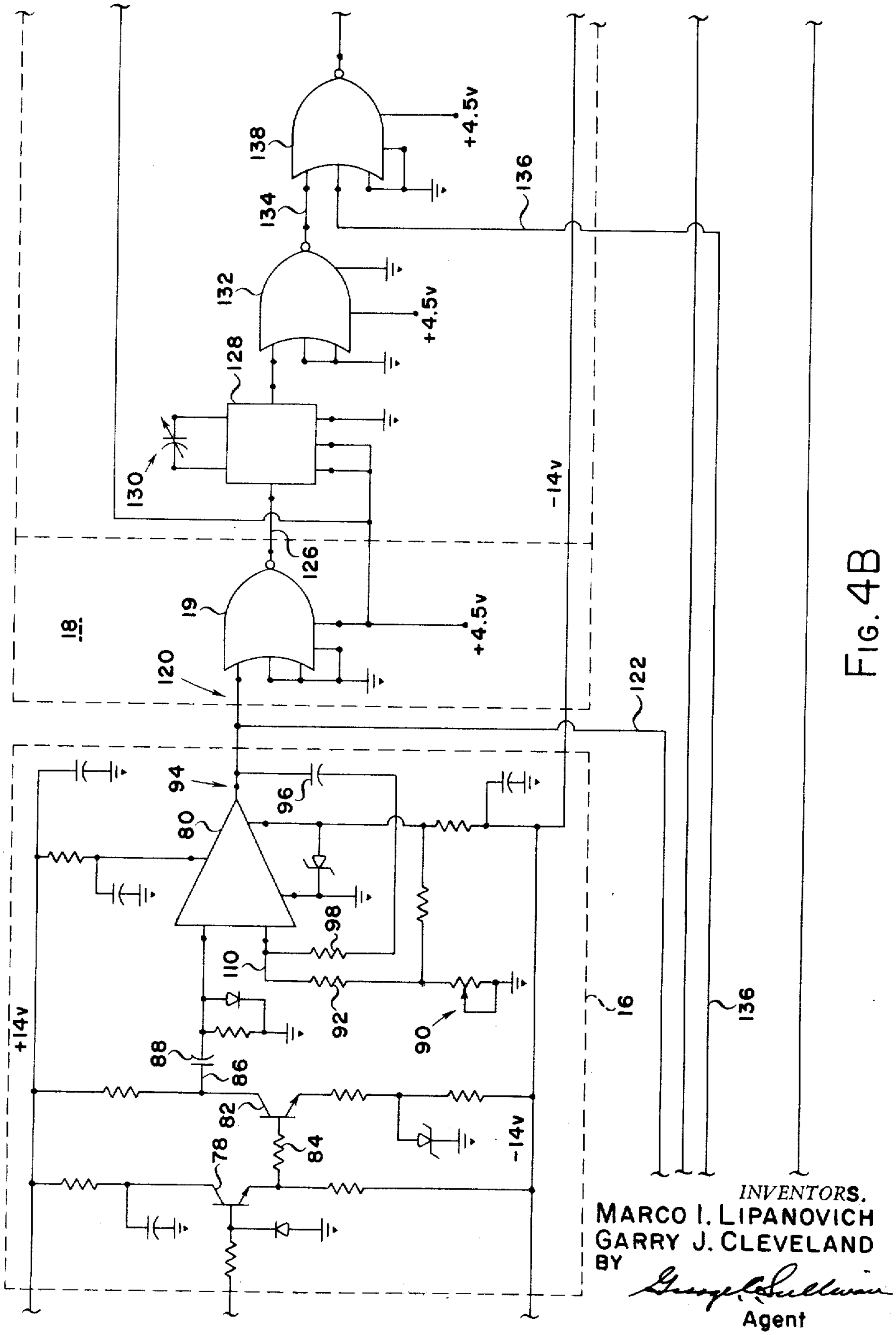

Continuing with the description of FIGURE 4B circuit arrangement 16 also includes an integrated differential comparator 80 and its associated circuitry. The output of transistor 78 is connected to the base of transistor 82 through a series connected resistor 84. The voltage gain realized from transistor 82 is on the order of five (5) while the output pulse thereof is inverted (a negative pulse). The output of transistor 82 is alternating current (A.C.) coupled of the inverting input of the differential comparator 80 along a conductor 86 and through a series connected capacitor 88. The differential comparator 80 has two primary functions, (a) as a pulse height discriminator which rejects all background noise appearing on the input signals it receives and (b) as an A.C. coupled positive feedback network which delays the turn-off time of the output pulse. The threshold level of the pulse height discriminator is controlled and adjustable through the use of a potentiometer 90 (illustrated as variable resistor) which is connected at one end to ground and at the other end to a series connected resistor 92 which is in turn connected to the non-inverting input end of differential comparator 80. The feedback network may be considered a pulse-stretching technique which produces a positive output pulse on the order of 55 times the input pulse signal as an example. The positive feedback network of the comparator 80 consists of a capacitor 96 in series with a resistor 98. An output signal from comparator 80 along conductor 94 is fed back through series connected capacitor 96 and resistor 98, where one end of resistor 98 is connected to the non-inverting input end of comparator 80 along a common conductor 110 to which resistor 92 is connected.

In operation the comparator 80 is triggered on the first negative input pulse above the threshold level and will reject any other pulses that appear on the input for a period equal to the delay introduced by the feedback circuit. Thus, the differential comparator 80 will only respond to one point of light on each scan of the cathode ray tube 28.

The output of circuit arrangement 16 branches in two directions. One branch 120 is connected to an integrated "NOR" logic circuit 18, consisting of one circuit element 19, while the other branch 122 is connected to an integrated "AND" logic circuit element 124 of logic circuit arrangement 26. The signal fed to "NOR" circuit element 19 will hereinafter be referred to as the "cursor signal" and the signal fed to "AND" circuit element 124 will hereinafter be referred to as the "selection signal."

The cursor signal which is applied to "NOR" logic circuit 18 from circuit 16 is a positive pulse, and the output from circuit 18 is an inverted (negative) pulse of the same characteristics as the cursor signal.

The output of "NOR" circuit arrangement 18 is fed to a driver circuit arrangement 20, by conductor 126. Conductor 126 is connected to an integrated monostable multivibrator element 128 which is used to shorten the input cursor pulse. Illustratively, the input cursor signal is a 3 volt negative pulse of 11 microseconds duration while the output of circuit 128 is shortened to about 500 nanoseconds. The duration of this output pulse may be controlled by varying the value of a capacitor 130 which is part of element 128. Thus, the width of the cursor signal may be varied by empirical means or tuning a variable capacitance as illustrated. For example, it has been found that the width of the cursor signal may be varied from approximately 100 to 800 nanoseconds by varying capacitor 130 from 0 to 200 picofarads.

Figures 4, 4C:
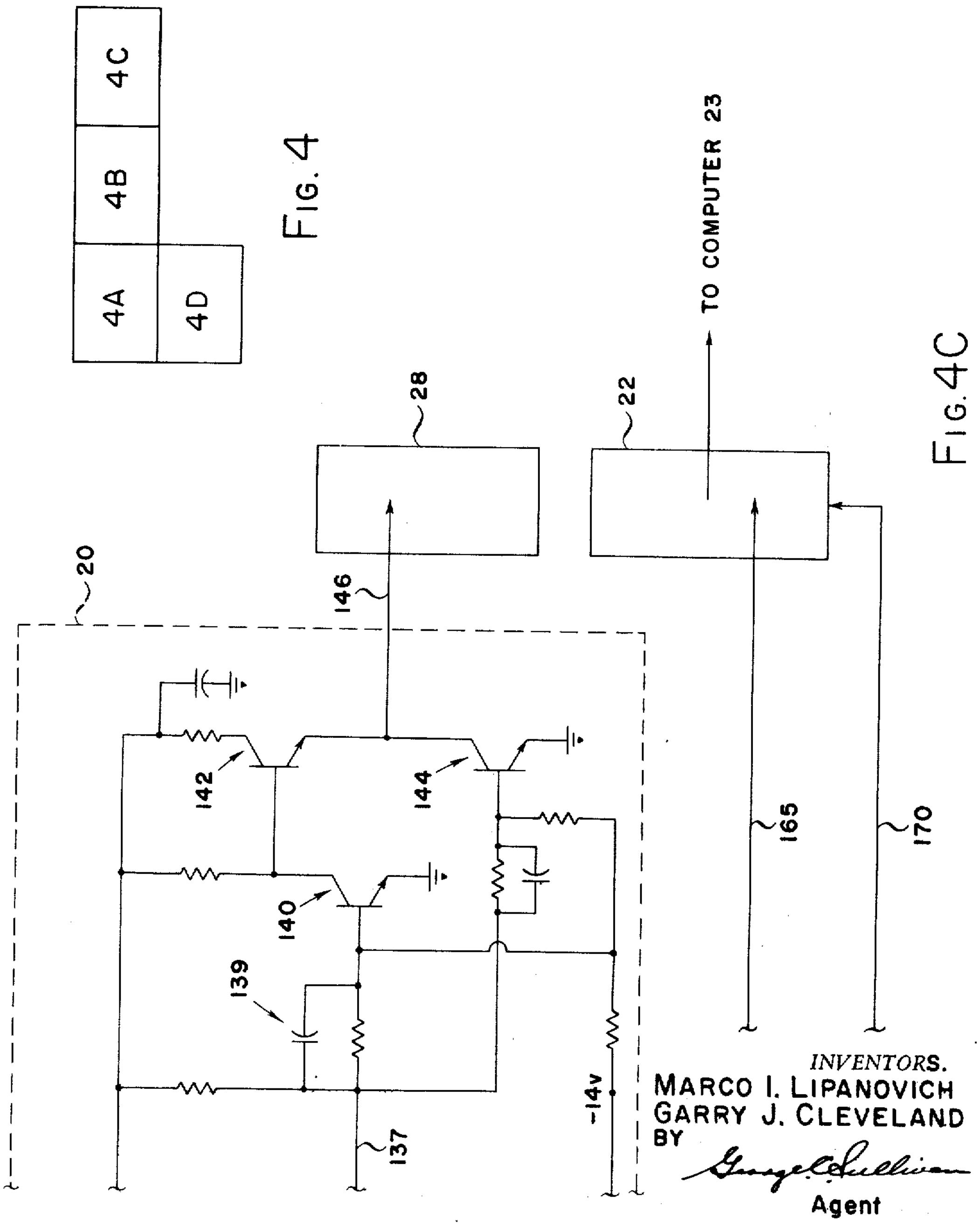
FIGURE 4 shows the relationship of FIGURES 4A thru 4D.

The next stage of drive circuit 20 is an integrated "NOR" logic element 132 which is connected in series with integrated circuit 128. "NOR" circuit 132 generates a cursor signal of the required polarity along a conductor 134 to logically "OR" at the input of a "NOR" logic element 138 with the video signal fed along a conductor 136 from the character generator device 21. The output of the integrated "NOR" circuit 138 along conductor 137 shown in FIGURES 4B and 4C contains both the cursor signal and the video information signal. A discrete circuit arrangement 139 consisting of three transistors 140, 142 and 144 and their associated circuitry form a coaxial line driver arrangement as shown in FIGURE 4C and receives its input along conductor 137 connected thereto. The output from this coaxial driver arrangement produces a positive pulse for a terminated coaxial line 146 which is connected to the grid of the cathode-ray tube 28. The cursor or marker displayed on the face of the cathode-ray tube is generated by driver circuit arrangement 20.

Figure 4D:
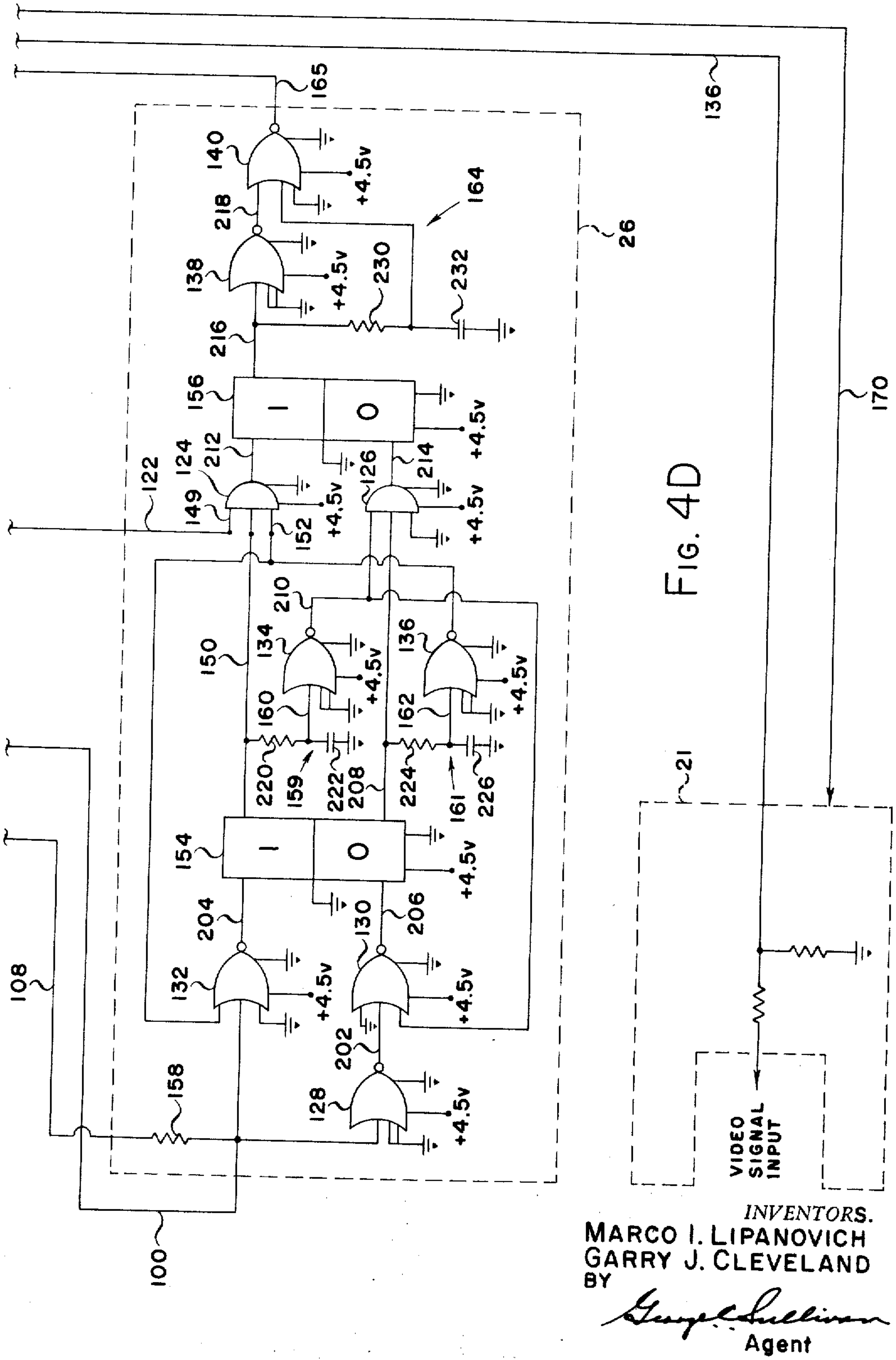

The details of the logic circuit arrangement 26 as shown in FIGURE 4D which is utilized during the information selection process may best be understood by considering the selection signal from conductor 122. Conductor 122 connects circuit arrangement 16 of FIGURE 4B to circuit arrangement 26 of FIGURE 4D where it is connected to one of the input connections 149 of an integrated "AND" circuit element 124. As an example for this embodiment the selection signal applied at input 149 is a 3 volt positive pulse of 11 microseconds duration.

Before discussing logic circuit arrangement 26 and its operation in detail several explanations and definitions regarding logic circuits will set forth as an aid to understanding the operation of the circuit 26. First, as shown in FIGURE 4D a pair of integrated binary logic elements 154 and 156 (also commonly known as flip-flops) start in the "reset" condition, this means that the "zero" (0) output terminal produces a "true" level and the "one" (1) output terminal produce a "false" level. The binary element can be put in the "set" condition only when a "true" level appears on the "one" input and can be "reset" only when a "true" level appears on the "zero" input. Secondly, logic circuit arrangement 26 is based on "positive true" logic, that is, a positive voltage of approximately +3 v. is the "true" level and ground (0 volts) is the "false" level. Lastly: (a) in an "OR" circuit when any input is "true" the output is "true," consequently, all inputs must be "false" in order that the output is "false," (b) "NOR" circuit operates the same as an "OR" circuit, except the output is inverted, and (c) an "AND" circuit all inputs must be "true" for the output to be "true."

It should be noted at this point that the "selection signal" applied to the input of "AND" circuit 124 is a repetitive positive pulse signal corresponding to the cursor signal, but the signal cannot propagate therethrough unless the other logic inputs 150 and 152 are positive or "true." Inputs 150 and 152 do not become positive unless and until the switch 40 located in light pen probe 12 is closed. The details of how inputs 150 and 152 become positive and when they become negative will be discussed in greater detail with reference to FIGURES 4B, 4D and 5.

Figure 5:
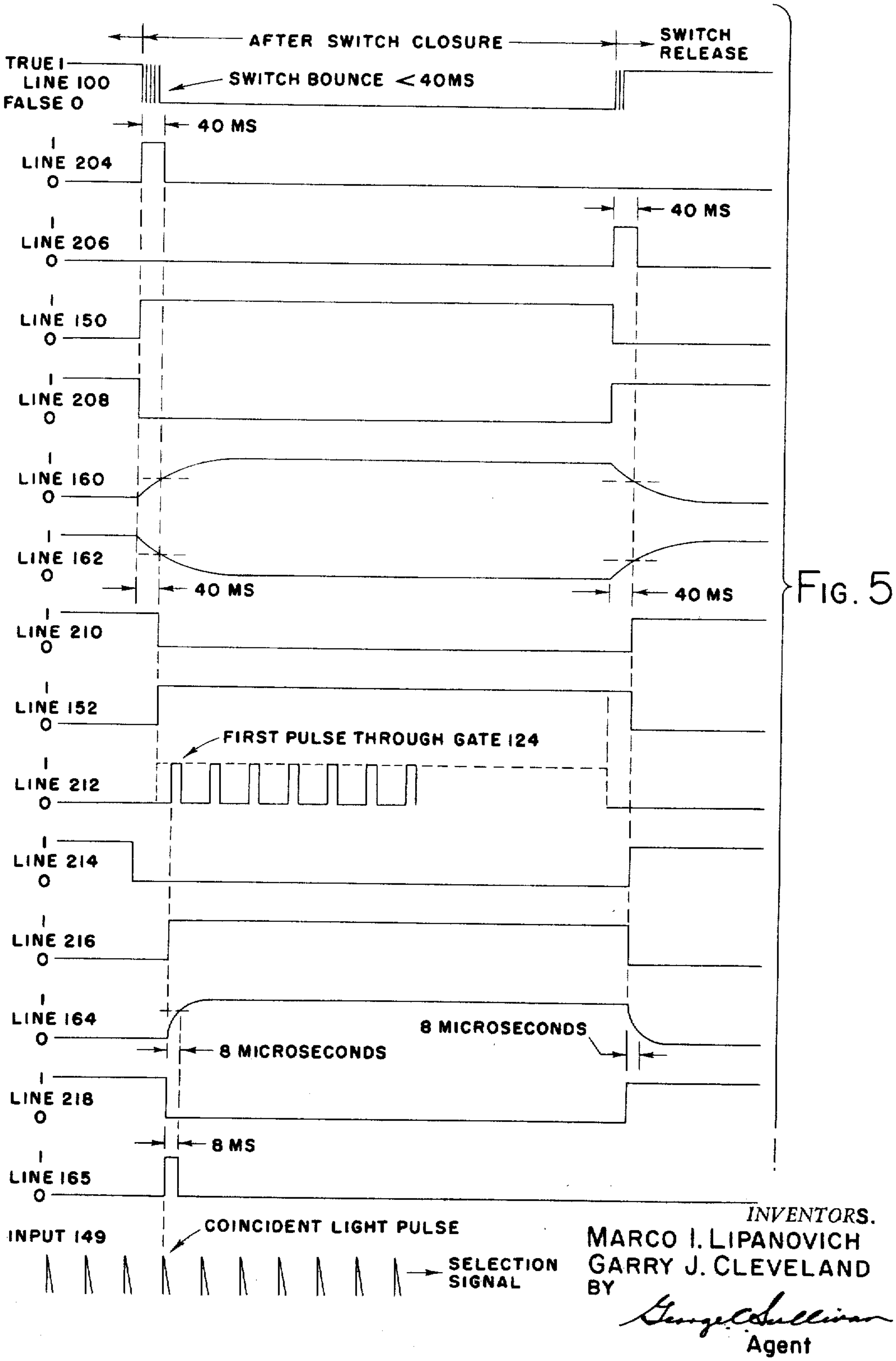
FIGURE 5 is a timing diagram for the operation of the logic circuit arrangement contained in FIGURES 1 and 4A to 4D illustrating the unique manner in which a time correlated output pulse signal to a data processor is derived and used for information selection purposes.

FIGURE 5 is a timing diagram setting forth the conditions which exist at the input and output terminals of each element of the logic circuit arrangement 26 when switch 40 is (a) in the normally open position ("reset" or "steady state" condition), (b) in the closed position, when the operator presses the switch to make a selection, and (c) when the switch is released and the circuits are returned to the reset condition. The diagram also takes into account several time delays introduced at various points in the logic sequence. FIGURE 5 is included as an aid to help understand the logic circuit arrangement 26 and its operation. Frequent reference to it in connection with FIGURE 4D will be made.

Continuing with the discussion of FIGURE 4D, it should be noted that the most prominent purpose of logic circuit arrangement 26 is to obtain one and only one output pulse when the switch 40 of light pen 12 is closed and released during the information selection process. In other words the bounce of the switch during its make and break action will not propagate noise on the selection output line 165. In the illustrated embodiment one eight (8) microsecond output pulse is generated whose leading edge is coincident with the leading edge of one of many pulses on line 122. In the illustrated example the output of the "AND" gate 124 is ready to go to the "true" level 40 milliseconds after the switch of the light pen 12 is closed. Therefore, the next positive pulse that appears at input 149 after the 40 millisecond delay will cause the output line 212 to go to the "true" level. The state of readiness of "AND" gate 124 is illustrated by a dashed-line in FIGURE 5, timing diagram line 212. Therefore, the first coincident pulse to activate gate 124 occurs at least 40 milliseconds after the switch in the light pen is closed, as shown on line 212 of FIGURE 5.

From FIGURE 4D and FIGURE 5 it can be seen that when the switch of light pen 12 is closed the first binary logic element 154 is put immediately in the "set" condition, that is the "one" output, conductor 150 goes from the "false" to the "true" level and the "zero" output conducor 208 goes from the "true" to the "false" state. Binary element 154 cannot be "reset" for at least 40 milliseconds after it goes in the "set" condition. This delay prevents any retriggering of the binary element 154 by the inherent bounce of the switch.

More particularly, when the switch is closed, a negative step appears on timing diagram line 100 and is applied to integrated "NOR" circuits 128 and 132. The positive-going output signal of circuit 132 (on timing diagram line 204) is connected to the "one" (1) input of binary element 154 which causes the binary element to change to the "set" condition and consequently conductor 150 goes "true" and conductor 208 goes "false." This puts a "true" (+3 v.) signal to a 40 milliseconds delay network 159 composed of a resistor 220 and a capacitor 222 and to "AND" gate 124 along conductor 150.

Since the steady state input level of an integrated "NOR" circuit 134 is "false" at the output of delay network 159 along conductor 160 and the other two inputs are grounded, a conductor 210 must have a steady state "true" level and will not go "false" until 40 milliseconds after the switch is closed. Consequently, an integrated "NOR" circuit 130 cannot have a "true" output at a conductor 206 until 40 milliseconds after the switch is closed. Therefore, switch bounce noise appearing on a conductor 202 will not appear on the "NOR" output conductor 206 and therefore binary element 154 cannot "reset" until the switch is released.

Referring back to the instant when binary element 154 changes to the "set" condition and output conductor 208 of binary element 154 goes "false," a negative step will appear at the input conductor 208 of a second delay network 161 having a resistor 224 and a capacitor 226. The output of delay network 161 is illustrated at timing diagram line 162 and is applied to an integrated "NOR" circuit 136. The other two inputs of "NOR" circuit 136 are "false" (grounded) and the third input line 162 will go "false" after the 40 ms. delay, the output of 136 must go "true" 40 milliseconds after switch closure. Therefore, input lines 150 and 152 will both be "true" after the 40 millisecond delay. The next "selection signal" that appears on input terminal 149 of "AND" gate 124 will cause the output conductor 212 to go "true" and consequently, binary element 156 will change to the "set" condition.

When binary element 156 "sets" its "one" output conductor 216 will go "true" and consequently, output conductor 218 of "NOR" circuit 138 will go "false." As soon as "NOR" circuit 138 goes false, "NOR" element 140 will have all its inputs in the "false" state and consequently, its output on conductor 165 must change to the "true" level. An eight (8) microsecond delay, circuit having a resistor 230 and a capacitor 232, will cause the signal on conductor 164 to go "true" 8 microseconds after binary element 156 "sets." Therefore, the selection output signal along conductor 165, shall be one and only one 8 microsecond output pulse whose leading edge is coincident with the leading edge of the first light signal pulse occurring 40 milliseconds after the switch closure. Switch bounce may occur on thte closure of the switch without effecting the desired operation of the circuit. If switch bounce exceeds 40 milliseconds in duration the delay period may be extended by increasing delay capacitors 222 and 226.

The release of the switch 40 will reset binary element 154 immediately in a manner similar to its setting. Binary element 156 will reset 40 milliseconds after the switch 40 is released and circuit arrangement 26 will return to its "steady state" condition. FIGURE 5 displays the logic sequence occurring after switch release. Thus, switch bounce may occur after the switch is released without effecting the desired operation of the circuit.

Referring to FIGURE 5 timing diagram line 100, it can be seen that the timing diagrams illustrate the three conditions of the switch. First, the "steady state" condition before closure; second the condition after closure; and thirdly, the condition after release of the switch. It should be noted, that so long as the switch is in the closed position the series of event described hereinabove are applicable. Upon release of the switch a reverse series of events occur so as to place the circuit arrangement in the steady state condition. At this point the cycles may be repeated as rapidly as the operator is able to make selections with the light pan from the face of the cathode ray tube 28 by closing the switch in the light pen.

From the foregoing discussion of the invention it can be seen that an operator of a light pen associated with an information computer retrieval system and the like will be able with the aid of the continuous visual cursor (or marker) on the face of a video display screen to pick the exact area to be sampled by the light pen detector. The position of the cursor corresponds with the area of the display screen from which the light pen receives its light signals for the generation of the cursor.

In summary, the present invention provides an apparatus which has the advantages of extremely fast response for information selection while providing a continuous visual aid as to the exact location or position of the information to be selected.

In contrast to prior art techniques which are dependent upon the operator for the accuracy obtainable, the present invention substantially reduces or eliminates the degree of care required in the past. Stated in a different manner, the present invention provides apparatus which approaches an error proof situation. Thus, the efficiency and speed with which the operator is able to function is greatly enhanced.

It is to be understood that the above described embodiment is only an illustration of the principles applicable in the invention. Numerous other modifications may be defined by those skilled in the art without departing from the scope and spirit of the invention. Accordingly, it is to be understood that the present invention is limited only by the spirit and scope of the appended claims. The term "means" as used in the appended claims is intended to cover various equivalents for performing the specific function or functions and is not to be construed as limited to the specific embodiment or embodiments shown.

What is claimed is:

1. In an apparatus for selecting information indicia from a computor information storage and retrieval apparatus by displaying said information indicia on the screen of an electronic visual display means connected to said computer storage and retrieval apparatus and selecting said information indicia with a hand positionable light detecting probe, said light detecting probe detecting visal information on only the minor area of said visual display screen toward which it is aimed and providing corresponding electrical output signals therefrom, the improvement comprising:

amplification circuit means connecting with the output of said light detecting probe for continuously receiving and amplifying said electrical output signals from said light detecting probe;

pulse shaping circuit means connecting with the output of said amplification circuit means for producing cursor output pulses initiated by said output signals from said light detecting probe of preset amplitude and length;

said pulse shaping circuit means including threshold noise limiting means;

said pulse shaping circuit means having its output connected to said visual display means for applying said cursor output pulses directly thereto for applying continuous visual cursors on said screen for the visual information thereon detected by said light detecting probe, independently of said computor storage and retrieval apparatus;

and hand actuated switch means for operably connecting said output signals from said light detecting probe to said computor storage and retrieval apparatus when said switch means are actuated.

References Cited

UNITED STATES PATENTS

| | | | |
|---|---|---|---|
| 3,130,317 | 4/1964 | Connelley et al. | 250—227 |
| 3,151,248 | 9/1964 | Glaser et al. | 250—227 |
| 3,337,860 | 8/1967 | O'Hara | 340—324 |
| 3,346,853 | 10/1967 | Koster et al. | 340—172.5 |

RAULFE B. ZACHE, Primary Examiner

U.S. Cl. X.R.

250—217